United States Patent Office 2,745,546
Patented May 15, 1956

---

2,745,546

TREATING PACKING MATERIAL

Carl Fischer, Hamburg-Wandsbek, and Karl-Heinz Grodde, Hamburg, Germany

No Drawing. Application February 9, 1954, Serial No. 409,251

Claims priority, application Germany February 3, 1951

21 Claims. (Cl. 206—84)

The present invention relates to a process for treating packing material so as to prevent said packing material from adhering to bituminous substances.

It is an object of the present invention to provide a process for treating packing material so as to prevent said packing material from adhering to bituminous substances.

It is a further object of the present invention to provide a process for impregnating packing material with an alginic acid derivative thereby preventing adhesion of bituminous substances contacting said packing material.

It is a still further object of the present invention to provide a process for preparing dyed impregnated packing material which packing material does not adhere to bituminous substances.

The present invention further contemplates a process for making sheets of an alginic acid derivative which are not adhesive to bituminous substances and which sheets may be used either alone or as lining for the packing of bituminous substances.

It is another object of the present invention to prepare a coated packing material which is useful for the packing of bituminous substances because it does not adhere to said substances.

It is still another object of the present invention to provide a process for preparing a hygroscopic packing material which may stand for a long period of time without drying out and which packing material is not adhesive to bituminous substances.

With the above objects in view the present invention mainly consists of applying an aqueous impregnating solution containing at least one soluble alginic acid derivative to a packing material and precipitating a water insoluble derivative of alginic acid from said solution which adheres to the packing material and forms an impregnation which prevents adhesion of bituminous substances contacting said packing material.

It is a preferred embodiment of the present invention that the water soluble alginic acid derivative be an alkali metal salt of alginic acid, an ammonium salt of alginic acid, an amine of alginic acid, an ester or an ether of alginic acid. It is further preferred that the aqueous solution contain 0.5–5% of a soluble alginic acid derivative.

It is another preferred embodiment of the present invention that the insoluble derivative of alginic acid be precipitated by treatment with a water soluble heavy metal salt. This heavy metal salt reacts with the soluble alginic acid forming an insoluble heavy metal salt of alginic acid. The useful heavy metal salts are those such as soluble salts of iron, zinc, copper, lead, etc. It is preferable that soluble alkali earth salts such as calcium chloride be used for this purpose and it is further preferable that an excess of calcium chloride be used in precipitating the insoluble derivative of alginic acid. Some of the excess of calcium chloride remains in the textile material after it has been allowed to dry substantially, and this calcium chloride due to its hygroscopic properties prevents the material from drying completely. A total drying would cause the material to crack and lose its good surface.

It is another preferred embodiment of the present invention that the insoluble derivative of alginic acid be precipitated by the action of an acid-forming gas or by the action of a solution of an acid. Such acid-forming gases include hydrogen chloride, hydrogen bromide, hydrogen iodide, etc. The term acid-forming gas as used herein refers to those gases which in water solution form acids. Acids which may be used with the present invention include hydrochloric acid, hydrobromic acid, acetic acid, propionic acid, etc.

It is still another preferred embodiment of the present invention that either the impregnating solution or the precipitating means contain a water soluble hygroscopic substance such as a polyfunctional alcohol or derivative thereof. This hygroscopic substance is impregnated along with the insoluble alginic acid derivative, into the material and it thereby prevents the material from completely drying out. This allows for the material to stand for a long period of time without losing its non-adhesive surface and it further increases the elasticity and plasticity of the coated packing material.

It is further preferable that the impregnating solution or the precipitating means contain a water soluble film forming substance such as a high molecular weight sugar or a cellulose or cellulose derivative which is impregnated along with the insoluble alginic acid derivative. This substance, especially if it is a hygroscopic substance such as the methyl ether of cellulose prevents complete desiccation of the packing material and thereby increases the elasticity and plasticity of said packing material.

It is yet another preferred embodiment of the present invention that the impregnating solution contain a water soluble dye. The packing material coating is thereby dyed at the same time as it is made non-adhesive to bituminous substances.

The present invention further provides for including a filler such as fiber, wood, paper, mineral, etc. in comminuted form such as short fibers and powder. This filler material aids in completely filling the pores of the packing material especially where this packing material is one which has large pores e. g. a potato sack.

In the case where the packing material has extremely fine pores such as a metallic packing material the surface of the packing material is coated with the insoluble derivative of alginic acid. Such metallic material could not be impregnated because of the nature of the material, however the insoluble alginic acid derivative coating on the surface thereof prevents bituminous substances which are carried in this packing material from adhering to the packing material.

The present invention still further provides that the impregnating or coating solution includes a metallic powder such as aluminum powder, copper powder, bronze powder, etc. which powder is impregnated along with the insoluble alginic acid derivative into the packing material. This metallic powder prevents undesired heat from radiating into the packing material containing the bituminous substance and in the case where this bituminous substance is put in hot condition into the packing material it aids in quickly cooling the packing material by radiating heat from within the container.

The packing and transporting of bituminous, sticky and pasty substances particularly those which are packed while hot, at which time they are in a thinly liquid state has had many difficulties attached thereto. These substances when they cool become very viscous or even solid and in this state they stick to the packing material in which they are packed and transported and are very difficult to remove therefrom.

In order to remove these difficulties, very viscous bitumens are solidified in metal forms or solid bitumens are placed in these forms, heated and then resolidified, thereby forming solid blocks. The arrangement and shipping of these bitumen blocks has many difficulties and faults attached thereto. The solidified masses are deformed by their own weight and are further deformed by the action of the sun rays in the open or by placing these blocks in a warm environment. This causes the bitumens to have an unfavorable rheologic property. This further causes the so formed blocks to be deformed into dough-like masses.

To prevent such deformation the method was tried of filling strong paper bags with the bitumen. Besides the difficulties in the tearing of the bags and the fact that the bags are not tight and therefore leak, there are other difficulties involved in using such paper bags. The major difficulty is caused by the bag being saturated or impregnated with the bitumen and becoming solidly stuck to the bitumen making it almost impossible to remove the bitumen from the paper bag. Even though employing extreme care, a great part of the paper remains stuck to the bitumen.

Another means employed to eliminate the difficulties of packing and transporting bitumens involves filling thin walled sheet metal drums with the substance in molten state and then after shipment the entire mass is cut and the metal drum thrown away. Such method of packing has many faults, the major being that of the high price of the packing which causes the contents thereof to have a very high price. Furthermore, it is not expedient for the political economy of the country to use metal for the purpose of making such containers since it is only under the rarest circumstances that such containers may be re-used and therefore a great deal of metal is lost.

The present invention provides a process for treating packing material so as to make a cheap packing material for the carrying and transportation for such sticky substances as tar, paraffin wax, cement, putty, clay, resins, plastics, waxes, sticky pastes, etc.

The present invention removes all of the above enumerated faults by treating a packing material from metal, wood, paper, fiber and like material with an aqueous solution of a soluble derivative of alginic acid (polymannuronic acid) e. g. soluble salts of the acid, ethers, and esters. This solution is applied by e. g. painting, dipping the packing material into the solution or any other suitable means. This solution is then treated so as to precipitate an insoluble derivative of alginic acid which impregnates or coats the packing material, depending on the nature of the packing material.

The soluble salts of alginic acid include alkali metal salts, ammonium salts, amine salts, etc., e. g. sodium alginate, potassium alginate, ammonium alginate and the like. The soluble ethers and esters of alginic acid include methyl, ethyl, acetyl alginic acid and the like. These derivatives are very similar to salts of alginic acid. However the salts are more preferable with the present invention for reasons of economy.

To precipitate water insoluble derivative of alginic acid from the solution of the soluble alginate e. g. sodium or ammonium alginate, and to impregnate the packing material therewith, the solution is treated with a substance which will react with the alginic acid derivative to form an insoluble derivative of alginic acid. Such substances are for example gaseous acid-forming substances, acids in solution, and heavy metal or alkali earth metal salts, preferably carried in aqueous solution. This treatment causes an insoluble derivative of alginic acid to be formed, which derivative is impregnated into the pores of the packing material or forms a layer over the surface of the packing material thereby coating it. The thus treated packing material is mechanically very strong and is practically impermeable to liquids and gases.

The soluble heavy metal salts with which the impregnated solution of soluble alginate is treated include iron, copper, zinc, lead, etc. The soluble salts are for example iron chloride, copper sulphate, lead acetate. These salts may be applied in solid state to the impregnated solution, being therein dissolved by the water of said solution and reacting in said solution with the soluble alginate to form an insoluble heavy metal derivative of alginic acid. It is however preferable to use a solution of such heavy metal salt so as to facilitate this reaction. It is also possible to use water soluble alkali earth salts either in solid form or in solution. These alkali earth salts react with the soluble alginate to form an insoluble alkali earth derivative of alginic acid. The soluble alkali earth salts which may be used include, though not limited thereto, calcium chloride, strontium nitrate, barium acetate, etc.

The present invention is particularly applicable to packing materials which are relatively thin for example fiber sacks or paper having large pores e. g. potato sacks and bags. The treatment of such material with an alginate solution causes the solution to be impregnated in the pores of the material. The treatment of a metal on the other hand causes a coating on the metal surface. This thus treated sack is further treated with a solution such as calcium chloride which causes an instantaneous gelatinization and precipitation of an insoluble alginate which impregnates the packing material. Such sack is useful for the packing and transporting of bitumens and similar substances, the covering of the sack being impermeable and non-adhesive to the bitumens.

When the precipitating solution contains a high percentage of calcium chloride, a slight excess of the calcium chloride is impregnated into the packing material with the insoluble alginate and remains therein. Due to the hygroscopic nature of calcium chloride, this prevents a complete drying of the packing material.

The strength of the impregnating layer depends partly on the amount of water given up by the gel through syneresis. The syneresis is to an extent controllable by the concentration, temperature and time of action of the precipitating solution. It is further dependent of course upon the concentration and extent of polymerization of the alginic acid derivative.

To increase the plasticity and elasticity of the impregnation and to prevent this impregnation from completely drying out it is favorable to include a water soluble agent such as glycerine, glycol, glycol ether, etc. in either the impregnated solution or in the precipitating solution. It is particularly favorable to include these substances in the event that the packing material with which it is treated is to stand for a long period of time before it is to be filled with a bituminous substance. After filling the packing material e. g. a sack with a material to be packed, especially in the case of a material having a high melting point, it is additionally important to prevent a total drying of the impregnation.

It was further found that the elasticity and plasticity can be further increased by including a water soluble film forming derivative of cellulose or a high molecular weight, hygroscopic sugar in the impregnating solution, e. g. cellulosemethyl ester.

It is further possible to increase the mechanical properties of the coating for covering by including a filler in the alginate solution. This filler aids in forming a strong coating of a packing material. Such filler may be e. g. fiber, paper, wood, minerals, silicates, etc. in short fiber or powder form, being finely comminuted so as to cause better distribution of the filler throughout the impregnating layer.

It has further been found that undesired heat radiation from without the packing material can be prevented and quicker cooling of the material inside the packing material can be aided by the addition of heat radiating metal powders into the alginate solution, e. g. aluminum powder, bronze powder, etc.

To be certain that the impregnation is complete, especially in the case of a fabric having large pores, and to be further certain that there is no non-impregnated pores, a preferred embodiment of the present invention provides for the addition of a soluble dye to the alginate solution. It is then easy to determine by examination of the impregnated sack whether there is any defective spot or spots in the sack by noting any light portions in the impregnated pores.

It has further been found by the present invention that packing material treated according to the invention, particularly sacks, if laterally closed by an easily removable draw-cord, can be easily removed from the material within the sacks by simply pulling the draw-cord and thereby freeing the sack from the material. It is preferable to provide an impregnated packing material of this type with a draw-cord and then further subject the sack to the same impregnating treatment so as to make the seams and holes through which the draw-cord passes, impermeable. The property of alginate coatings to be poorly adhesive to bituminous and similar substances is advantageous in this respect.

The present invention further provides for preparing a separate sheet of packing material which may be used for lining other bags etc,. or may be used directly for wrapping bituminous substances. To prepare such sheet, a smooth surface such as a roller or a band is treated with a solution containing alginate (with or without filler) so as to coat the smooth surface. This solution is then treated with a precipitating agent so as to precipitate an insoluble alginate on the surface. After corresponding drying the layer or sheet is removed from the smooth surface. Such sheet may be used directly for the packing of sticky substances.

The following examples are illustrative of preferred embodiments of the present invention, the scope of said invention not however being limited thereto.

*Example I*

A sack having large pores e. g. such as those used to transport potatoes, is immersed in a 1.5% aqueous solution of sodium alginate for a few minutes. The thus treated sack is then further treated with a 40% solution of calcium chloride, e. g. through immersion in such solution, for about 5 minutes. After removing the sack from the calcium chloride solution it is allowed to drain for about an hour so that the major quantity of water is forced out through syneresis.

The thus prepared packing material is then ready to receive bitumens or the like which may be poured therein at temperatures of about 100° C., these substances being pourable at this temperature. After cooling and solidifying of the bitumens the sack may be laterally cut and allows for the easy removal of the bitumen. Bitumens stored for a long period of time in such sacks remain undeformed and may be easily removed from the sack even after months in a warm and/or sunny environment.

*Example II*

A sack made of paper having fine pores is immersed in a 1% solution of sodium alginate to which 5% glycol has been added. This sack is then treated with a solution of hydrochloric acid, likewise containing 5% glycol, for 5 minutes. After a few hours or even after a few days, the sack may be filled with liquid bitumens or other substances at temperatures of even 250° C., the impregnating layer remaining elastic even in such heat.

*Example III*

A conical-shaped iron mold is treated with a 2% ammonium alginate solution, e. g. by painting it with a brush. The thus treated mold is then sprayed with a concentrated iron chloride solution. This mold may be filled with bitumens at any temperature and these bitumens when cold are easily removable from the form.

*Example IV*

For certain purposes it is desirable to stabilize certain packing materials such as wooden barrels. Such wooden barrels are treated as in Example III. After cooling of bitumen with which it has been filled, the barrel hoop may be removed at the place wherein the bitumens are desired to be used. It is very easy then to remove the bitumen from the barrel staves.

It will be understood that each of the elements described above, or two or more together, may also find a useful application in other types of processes for making packing material non-adhesive differing from the types described above.

While the invention has been illustrated and described as embodied in processes for impregnating and coating packing material so as to make said packing material nonadhesive, it is not intended to be limited to the details shown, since various modifications may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of packing bituminous substances, comprising in combination the steps of applying to a packing material an aqueous impregnating solution containing at least one soluble alginic acid derivative; precipitating from said thus applied impregnating solution a water insoluble derivative of alginic acid which adheres to said packing material and forms an impregnation preventing adhesion of bituminous substances contacting said packing material; and packing bituminous substances in the thus treated packing material.

2. Method of packing bituminous substances, comprising in combination the steps of applying to a packing material an aqueous impregnating solution containing 0.5% to 5% of at least one soluble alginic acid derivative; precipitating from said thus applied impregnating solution a water insoluble derivative of alginic acid which adheres to said packing material and forms an impregnation preventing adhesion of bituminous substances contacting said packing material; and packing bituminous substances in the thus treated packing material.

3. Method of packing bituminous substances, comprising in combination the steps of applying to a packing material an aqueous impregnating solution containing at least one soluble alginic acid derivative; treating the thus applied impregnating solution with at least one water soluble heavy metal salt so as to precipitate from said thus applied impregnating solution a water insoluble heavy metal derivative of alginic acid which adheres to said packing material and forms an impregnation preventing adhesion of bituminous substances contacting said packing material; and packing bituminous substances in the thus treated packing material.

4. Method of packing bituminous substances, comprising in combination the steps of applying to a packing material an aqueous impregnating solution containing at least one soluble alginic acid derivative; treating the thus applied impregnating solution with at least one water soluble alkali earth salt so as to precipitate from said thus applied impregnating solution a water insoluble alkali earth derivative of alginic acid which adheres to said packing material and forms an impregnation preventing adhesion of bituminous substances contacting said packing material; and packing bituminous substances in the thus treated packing material.

5. Method of packing bituminous substances, comprising in combination the steps of applying to a packing material an aqueous impregnating solution containing at least one soluble alginic acid derivative; treating the thus applied impregnating solution with at least one gaseous acid-forming substance so as to precipitate from said thus applied impregnating solution a water insoluble derivative of alginic acid which adheres to said packing material and forms an impregnation preventing adhesion of bituminous substances contacting said packing material; and packing bituminous substances in the thus treated packing material.

6. Method of packing bituminous substances, comprising in combination the steps of applying to a packing material an aqueous impregnating solution containing at least one soluble alginic acid derivative; treating the thus applied impregnating solution with at least one acid so as to precipitate from said thus applied impregnating solution a water insoluble derivative of alginic acid which adheres to said packing material and forms an impregnation preventing adhesion of bituminous substances contacting said packing material; and packing bituminous substances in the thus treated packing material.

7. Method of packing bituminous substances, comprising in combination the steps of applying to a packing material an aqueous impregnating solution containing at least one soluble alginic acid derivative; treating the thus applied impregnating solution with at least one gaseous-acid-forming substance selected from the group consisting of hydrogen chloride, hydrogen bromide, and hydrogen iodide so as to precipitate from said thus applied impregnating solution a water insoluble derivative of alginic acid which adheres to said packing material and forms an impregnation preventing adhesion of bituminous substances contacting said packing material; and packing bituminous substances in the thus treated packing material.

8. Method of packing bituminous substances, comprising in combination the steps of applying to a packing material an aqueous impregnating solution containing at least one soluble alginic acid derivative selected from the group consisting of alkali metal salts of alginic acid, ammonium salts of alginic acid, amines of alginic acid, esters of alginic acid and ethers of alginic acid; precipitating from said thus applied impregnating solution a water insoluble derivative of alginic acid which adheres to said packing material and forms an impregnation preventing adhesion of bituminous substances contacting said packing material; and packing bituminous substances in the thus treated packing material.

9. Method of packing bituminous substances, comprising in combination the steps of applying to a packing material an aqueous impregnating solution containing at least one soluble alginic acid derivative selected from the group consisting of alkali metal salts of alginic acid, ammonium salts of alginic acid, amines of alginic acid, esters of alginic acid and ethers of alginic acid; treating the thus applied impregnating solution with calcium chloride so as to precipitate from said thus applied impregnating solution a water insoluble calcium derivative of alginic acid which adheres to said packing material and forms an impregnation preventing adhesion of bituminous substances contacting said packing material; and packing bituminous substances in the thus treated packing material.

10. Method of packing bituminous substances, comprising in combination the steps of applying to a packing material an aqueous impregnating solution containing at least one soluble alginic acid derivative and including at least one finely comminuted filler; precipitating from said thus applied impregnating solution a water insoluble derivative of alginic acid which adheres to said packing material and forms an impregnation preventing adhesion of bituminous substances contacting said packing material; and packing bituminous substances in the thus treated packing material.

11. Method of packing bituminous substances, comprising in combination the steps of applying to a packing material an aqueous impregnating solution containing at least one soluble alginic acid derivative and including at least one metallic powder adapted to radiate heat; precipitating from said thus applied impregnating solution a water insoluble derivative of alginic acid which adheres to said packing material and forms an impregnation preventing adhesion of bituminous substances contacting said packing material; and packing bituminous substances in the thus treated packing material.

12. Method of packing bituminous substances, comprising in combination the steps of applying to a packing material an aqueous impregnating solution containing at least one soluble alginic acid derivative; precipitating from said thus applied impregnating solution a water insoluble derivative of alginic acid which adheres to said packing material and forms an impregnation preventing adhesion of bituminous substances contacting said packing material; allowing the water to drain from the thus impregnated packing material so as to remove the major portion of water therefrom, thereby obtaining an impregnated packing material which does not adhere to bituminous substances; and packing bituminous substances in the thus treated packing material.

13. Method of packing bituminous substances, comprising in combination the steps of applying to a packing material an aqueous impregnating solution containing at least one water soluble hygroscopic agent and at least one soluble alginic acid derivative; precipitating from said thus applied impregnating solution a water insoluble derivative of alginic acid which adheres to said packing material and forms an impregnation preventing adhesion of bituminous substances contacting said packing material; allowing the water to drain from the thus impregnated packing material so as to remove the major portion of water therefrom, said hygroscopic agent preventing complete drying of said thus impregnated packing material, thereby obtaining an impregnated packing material, having high elasticity and plasticity, which does not adhere to bituminous substances; and packing bituminous substances in the thus treated packing material.

14. Method of packing bituminous substances, comprising in combination the steps of applying to a packing material an aqueous impregnating solution containing at least one water soluble hygroscopic agent selected from the group consisting of water soluble polyfunctional alcohols and water soluble derivatives thereof and at least one soluble alginic acid derivative; precipitating from said thus applied impregnating solution a water insoluble derivative of alginic acid which adheres to said packing material and forms an impregnation preventing adhesion of bituminous substances contacting said packing material; allowing the water to drain from the thus impregnated packing material so as to remove the major portion of water therefrom, said hygroscopic agent preventing complete drying of said thus impregnated packing material, thereby obtaining an impregnated packing material, having high elasticity and plasticity, which does not adhere to bituminous substances; and packing bituminous substances in the thus treated packing material.

15. Method of packing bituminous substances, comprising in combination the steps of applying to a packing material an aqueous impregnating solution containing at least one water soluble substance adapted to form a film when partially dry selected from the group consisting of water soluble sugars having a high molecular weight and water soluble cellulose derivative and at least one soluble alginic acid derivative; precipitating from said thus applied impregnating solution a water insoluble derivative of alginic acid which adheres to said packing material and forms an impregnation preventing adhesion of bituminous substances contacting said packing material; allowing the water to drain from the thus impregnated packing material so as to remove the major portion of water therefrom, said substance forming a film and preventing complete drying of said thus impregnated packing material, thereby obtaining an impregnated packing material, having high elasticity and plasticity, which does not adhere to bituminous substances; and packing bituminous substances in the thus treated packing material.

16. Method of packing bituminous substances, comprising in combination the steps of applying to a porous packing material an aqueous impregnating solution containing at least one soluble alginic acid derivative and including a water soluble dye; precipitating from said thus applied impregnating solution a water insoluble derivative of alginic acid which adheres to said packing material and forms an impregnation preventing adhesion of bituminous substances contacting said packing material; allowing the water to drain from the thus impregnated packing material so as to remove the major portion of water therefrom, thereby obtaining a dyed impregnated packing material which does not adhere to bituminous substances; and packing bituminous substances in the thus treated packing material.

17. Method of packing bituminous substances, comprising in combination the steps of applying to a smooth surface an aqueous solution containing at least one water soluble alginic acid derivative; precipitating from said thus applied aqueous solution a water insoluble derivative of alginic acid thereby coating said smooth surface with said water insoluble derivative of alginic acid; drying said coating on said smooth surface thereby forming a sheet of packing material which does not adhere to bituminous substances; and packing bituminous substances in said thus formed sheet of packing material.

18. Method of packing bituminous substances, comprising in combination the steps of applying to a smooth surface an aqueous solution containing at least one water soluble alginic acid derivative and including at least one finely comminuted filler; precipitating from said thus applied aqueous solution a water insoluble derivative of alginic acid thereby coating said smooth surface with said water insoluble derivative of alginic acid and filler; drying said coating on said smooth surface thereby forming a sheet of packing material which does not adhere to bituminous substances; and packing bituminous substances in said thus formed sheet of packing material.

19. A packing material impregnated with a substance essentially consisting of a water insoluble derivative of alginic acid, preventing adhesion of bituminous substances contacting said packing material; and a bituminous substance packed in said packing material.

20. A packing material coated with a substance essentially consisting of a water insoluble derivative of alginic acid firmly adhering to the surface of said packing material, preventing adhesion of bituminous substances contacting said packing material; and a bituminous substance packed in said packing material.

21. A packing material impregnated with a substance essentially consisting of a water insoluble heavy metal derivative of alginic acid, preventing adhesion of bituminous substances contacting said packing material; and a bituminous substance packed in said packing material.

References Cited in the file of this patent

UNITED STATES PATENTS

| | | |
|---|---|---|
| 2,287,849 | Wilson | June 30, 1942 |
| 2,435,701 | Vallandigham | Feb. 10, 1948 |